B. F. SUTHERLAND.
SLEIGH ATTACHMENT FOR AUTOMOBILES, &c.
APPLICATION FILED JULY 27, 1917.
1,305,629.
Patented June 3, 1919.
2 SHEETS—SHEET 2.
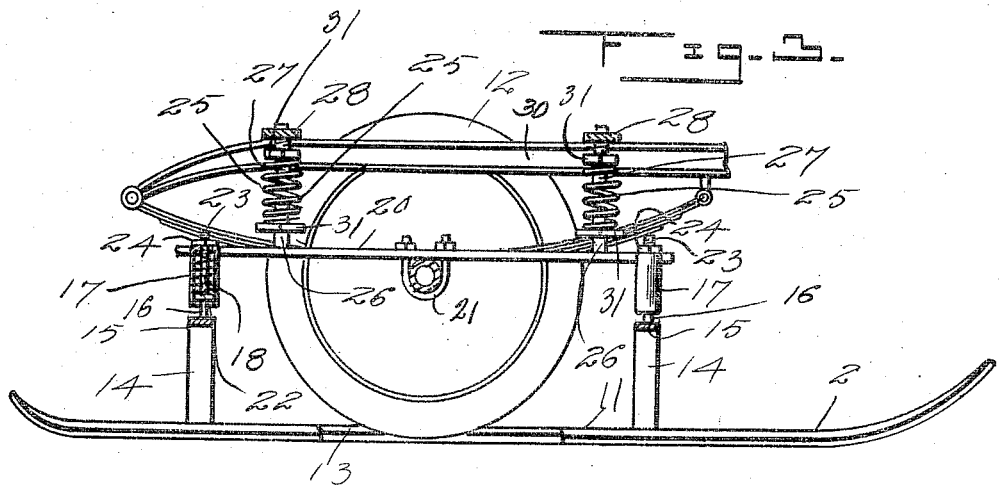
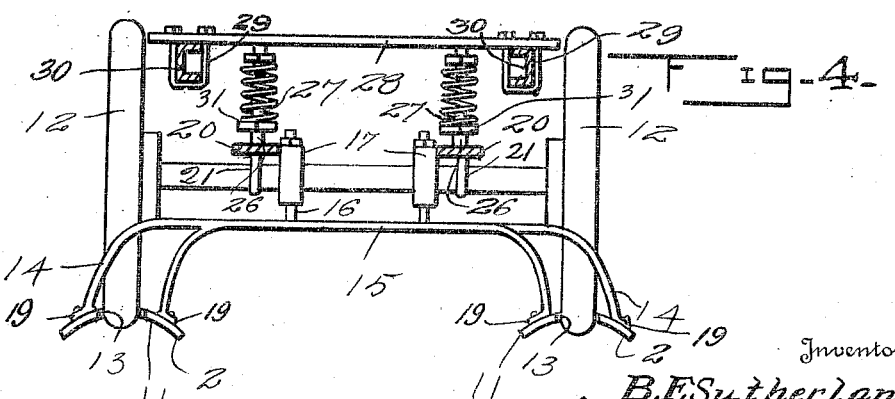
Witnesses
Inventor
B. F. Sutherland
Attorney

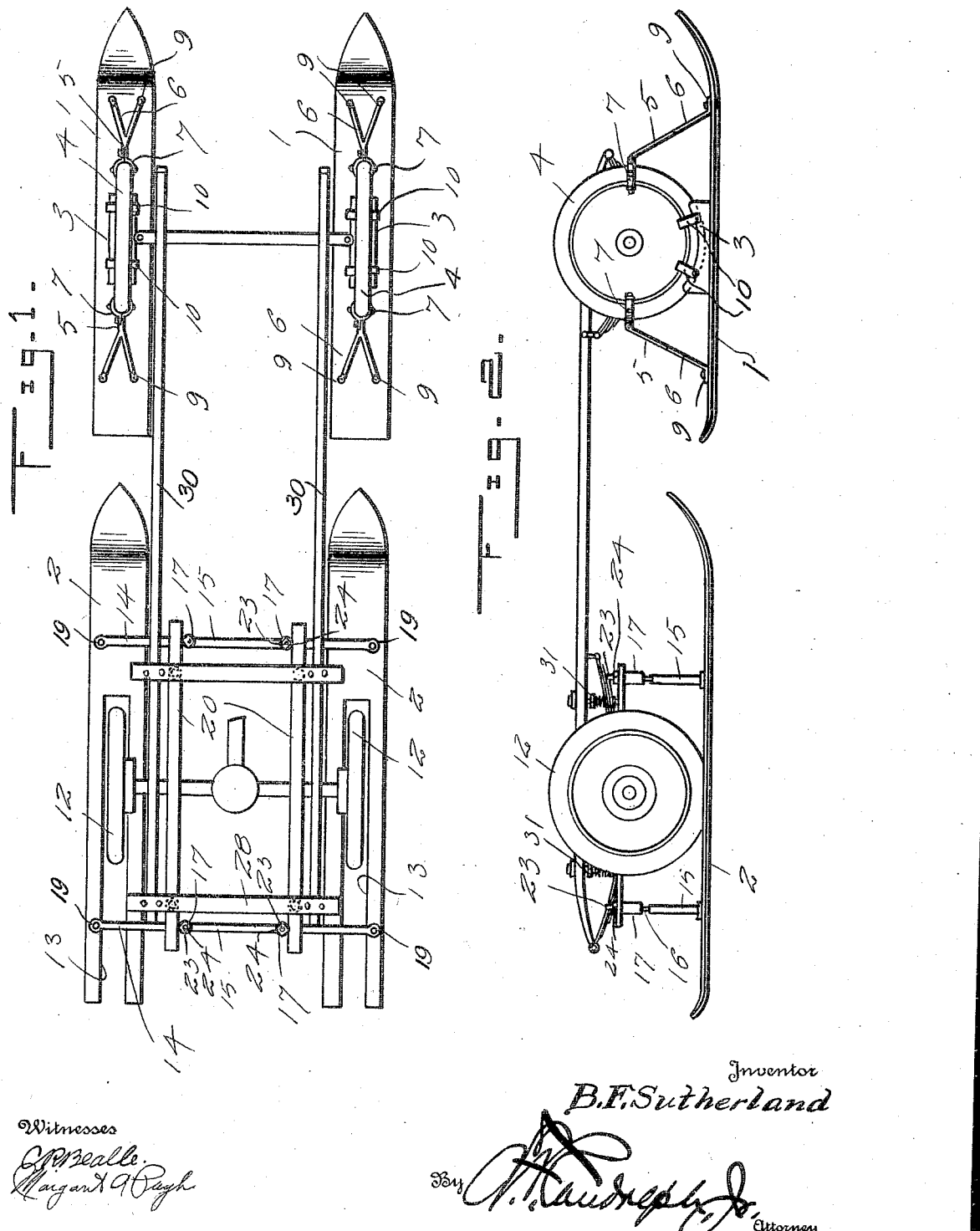

UNITED STATES PATENT OFFICE.

BENJAMIN F. SUTHERLAND, OF McGILL, NEVADA.

SLEIGH ATTACHMENT FOR AUTOMOBILES, &c.

1,305,629.	Specification of Letters Patent.	Patented June 3, 1919.

Application filed July 27, 1917. Serial No. 183,121.

*To all whom it may concern:*

Be it known that I, BENJAMIN FRANKLIN SUTHERLAND, a citizen of the United States, residing at McGill, in the county of White Pine and State of Nevada, have invented certain new and useful Improvements in Sleigh Attachments for Automobiles, &c.; and I do hereby declare the following to be a full, clear, and exact description of the invention, such as will enable others skilled in the art to which it appertains to make and use the same.

The invention relates to sleigh attachments for automobiles, and other motor vehicles.

The object of the present invention is to provide a simple, practical and efficient sleigh attachment for automobiles and various motor vehicles adapted to be readily applied to the same and capable of enabling the vehicle to be steered with the same facility as it would without the attachment. It is also an object to provide a sleigh attachment of this character of strong and durable construction adapted to permit the rear or drive wheels to engage the snow or other slippery surface and equipped with means for packing the snow at the tread of the drive wheels so that a positive propulsion of the machine will be obtained.

With these and other objects in view, the invention consists in the construction and novel combination of parts hereinafter fully described, illustrated in the accompanying drawings and pointed out in the claims hereto appended; it being understood that various changes in the form, proportion, size and minor details of construction, within the scope of the claims, may be resorted to without departing from the spirit or sacrificing any of the advantages of the invention.

In the drawings;

Figure 1 is a plan view of a sleigh attachment for automobiles constructed in accordance with this invention and shown applied to a portion of an automobile.

Fig. 2 is a side elevation of the same.

Fig. 3 is a longitudinal sectional view through the rear portion of the attachment.

Fig. 4 is a back view of the attachment as applied partly in section.

Like numerals of reference designate corresponding parts in the several figures of the drawings.

In the accompanying drawings, in which is illustrated the preferred embodiment of the invention, the sled attachment for automobiles comprises in its construction front and rear runners 1 and 2, the front runners 1 being provided intermediate of their ends with seats 3 for the reception of the front wheels 4 and having front and rear inclined braces 5 provided with forked lower portions 6 and having curved plates or members 7 at their upper ends to fit the tire of the wheel at the front and back of the same. The curved plates 7 are provided with leather straps 8 which are buckled or otherwise secured around the wheels at the rim thereof, whereby the front and rear braces of the runners are detachably secured to the wheels 4. The forked lower portions or arms of the inclined braces 5 are provided with attaching plates 9 which are bolted or otherwise secured to the upper face of the runner 1 by suitable fastening devices. The seat 3 is provided with front and rear straps 10 which are fastened around the rim of the wheel at the bottom of the same. By means of the leather straps, the front runners may be quickly applied to and removed from the front wheels, but instead of employing leather straps any other suitable fastening means may be used for securing the inclined braces 5 to the front wheels and for fastening the latter upon the seats 3.

The front runners have flat lower faces and their front ends are curved upwardly so as to permit steering of the machine with the ordinary steering gear. The rear runners, which have curved upper portions, are curved or arched transversely to present a lower concave surface 11 to the snow for packing the same beneath the rear wheels 12, which project through longitudinal slots or openings 13 in the rear runners. The slots 13 extend to the rear ends of the rear runners to enable the device to be readily placed in position with relation to the rear wheels 12, and these slots terminate short of the front ends of the runners, as shown. The wheels may be equipped with antiskid chains in the usual manner to enable them to engage the snow and other smooth surfaces.

The rear runners are connected in advance and in rear of the rear wheels 12 with forked portions 14 of arched transverse connecting rods 15, provided at opposite sides of the center with upwardly extending stems 16 which operate in cylinders 17 and which are cushioned by coiled springs 18 housed in the said cylinders. The forked portions 14 form downwardly diverging arms which are provided at their ends with terminal attaching plates 19 secured by suitable fastening devices to the rear runners at opposite sides of the same. The cylinders are carried by longitudinal beams or members 20 connected by suitable clamps 21 with the rear axle and having a pivotal movement thereon to enable the runners to yield to the inequalities of the surface of the roadway. The stems 16 are provided with collars 22 to engage the springs, and their upper ends 23 are threaded for the reception of nuts 24 for adjusting the runners with respect to the wheels to secure the proper pressure on the same and to arrange them in proper position with relation to the treads of the wheels.

The clamps 21 form bearings for the longitudinal bars or members 20, which are arranged in parallelism and which are yieldably maintained in a horizontal position by front and rear coiled springs 25 arranged in pairs and located at opposite sides of the device in advance and in rear of the rear axle. The longitudinal beams or members 20 are provided with front and rear upwardly projecting stems or arms 26 on which the coiled springs are fitted, and the said coiled springs engage depending stems or arms 27 of front and rear transverse bars or members 28 secured by clamps 29 to the side beams or members 30 of the chassis. The arms 26 are threaded for the reception of adjusting nuts 31 which are adapted to regulate the tension of the springs so as to maintain the rear runners in proper and normal position. Any other suitable means may however be employed for connecting the longitudinal bars or members 20 with the automobile or other motor vehicle.

What is claimed is:

1. In a sleigh attachment for automobiles, two runners secured in parallel spaced relation each provided with a longitudinally extending slot adapted to receive the drive wheel of an automobile supported above said runners, said runners being of concavo-convex cross section so as to compact snow and similar materials over which they are driven and direct these compacted materials toward the slots of the runners so as to be engaged by the drive wheels of an automobile projecting through said slots.

2. In a sleigh attachment for automobiles, two spaced parallel runners provided with longitudinally extending slots adapted to receive the drive wheels of an automobile supported above said runners, and means for yieldably supporting an automobile above the runners so as to permit the rear wheels of the automobile to move vertically through said slots for engagement with the traction surface, said runners being provided with transversely concaved lower faces adapted to compact snow over which the runners are driven and to direct this compacted snow into the path of movement of said drive wheels so as to be engaged thereby.

3. In a sleigh attachment for automobiles, spaced parallel runners provided with longitudinally extending slots adapted to receive the rear wheels of an automobile, transversely extending connecting and brace rods having their terminals secured to said runners, one of said rods being provided with spaced upwardly projecting stems, and means for attaching the runners to a motor vehicle including cylinders receiving said stems and cushioning springs mounted within the cylinders and coacting with the stems for permitting independent vertical movement of the vehicle.

4. In a sleigh attachment for automobiles, two spaced parallel runners provided with longitudinally extending slots adapted to receive the rear wheels of an automobile supported above said runners, front and rear arched connecting and brace rods secured at their terminals to the runners and provided with upwardly projecting stems, longitudinally extending bars provided with cylinders secured thereto receiving said stems, cushion springs arranged within the cylinders and coacting with said stems, and means for securing said bars to an automobile frame so as to support the same above the runners for independent vertical movement.

5. In a sleigh attachment for automobiles, two runners secured in parallel spaced relation each provided with a longitudinally extending slot adapted to receive the drive wheel of an automobile supported above the runners, front and rear arched connecting and brace rods secured at their terminals to the runners and provided with spaced upwardly extending stems, longitudinally extending bars provided with cylinders secured thereto receiving said stems, cushion springs arranged within the cylinders and coacting with the stems, and means for securing said longitudinally extending bars to an automobile so as to support the automobile above the runners for independent vertical movement, said means including a transverse bar secured to said longitudinally extending bars, and clamps carried by said transverse bars and adapted to be secured about the side sills of the frame of an automobile.

In testimony whereof I affix my signature in presence of two witnesses.

BENJAMIN F. SUTHERLAND.

Witnesses:
Z. SLEETH,
MICHAEL HICKEY.

Copies of this patent may be obtained for five cents each, by addressing the "Commissioner of Patents, Washington, D. C."